(12) United States Patent
Kuroda

(10) Patent No.: US 6,804,020 B1
(45) Date of Patent: *Oct. 12, 2004

(54) IMAGE PROCESSING USING RECEIVED PROCESSING CONDITIONS

(75) Inventor: Ken Kuroda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,623

(22) Filed: Jun. 15, 1998

(30) Foreign Application Priority Data

Jun. 13, 1997 (JP) .............................................. 9/171197

(51) Int. Cl.[7] .............................................. G06F 3/00
(52) U.S. Cl. .................... 358/1.15; 358/1.13; 358/1.14; 358/1.9; 358/505; 358/474
(58) Field of Search .............................. 358/1.15, 1.14, 358/1.13, 1.9, 1.16, 1.1, 1.2, 1.3, 1.4, 1.5, 1.6, 1.7, 1.8, 1.11, 1.12, 1.17, 1.18, 505, 474

(56) References Cited

U.S. PATENT DOCUMENTS

| 4,839,829 | A | * | 6/1989 | Freedman | .................... 364/519 |
|---|---|---|---|---|---|
| 5,105,285 | A | * | 4/1992 | Miyata | ........................ 358/449 |
| 5,305,055 | A | * | 4/1994 | Ebner et al. | ................. 355/200 |
| 5,414,494 | A | * | 5/1995 | Aikens et al. | .............. 355/202 |
| 5,444,517 | A | * | 8/1995 | Nagashima | .................. 355/201 |
| 5,493,408 | A | * | 2/1996 | Kurogane et al. | .......... 358/296 |
| 5,689,755 | A | * | 11/1997 | Ataka | ............................ 399/8 |
| 5,854,693 | A | * | 12/1998 | Yoshiura et al. | ............ 358/468 |
| 5,935,217 | A | * | 8/1999 | Sakai et al. | ................. 709/249 |
| 6,081,342 | A | * | 6/2000 | Nakai et al. | ................ 358/1.16 |

* cited by examiner

Primary Examiner—King Y. Poon
(74) Attorney, Agent, or Firm—Fitzpatrick, Cella, Harper & Scinto

(57) ABSTRACT

An image processing apparatus and method are provided which permit cooperation of a plurality of image input/output units having image data input and/or output functions. The apparatus is connected to another device using a communication line, and receives image processing conditions from the other device. The apparatus processes image information transferred from the other device in accordance with the image processing conditions. When image processing is inexecutable under those conditions, the apparatus transmits executable image processing conditions in place of those received from the other device.

15 Claims, 19 Drawing Sheets

FIG. 5

PARAMETERS FOR COOPERATION
(UPON PAPER OUTPUT OPERATION)

| | |
|---|---|
| NUMBER OF OUTPUT SHEETS | 501 |
| IMAGE SIZE (LONGITUDINAL/TRANSVERSE) | 502 |
| IMAGE RESOLUTION | 503 |
| TWO-SIDE PRINT ON/OFF | 504 |
| SORT ON/OFF | 505 |
| PRINTING PAPER | 506 |
| MAGNIFICATIONS | 507 |

FIG. 19

NOTIFICATION OF CAUSE OF TROUBLE UPON COOPERATION

| PARAMETER | TROUBLE | SET VALUE | ACCEPTABLE VALUE |
|---|---|---|---|
| NUMBER OF OUTPUT SHEETS | OK | 10 | 1-99 |
| IMAGE SIZE (LONGITUDINAL/TRANSVERSE) | OK | 4000×700 [dot] | (1-4000)×(1-7000) [dot] |
| IMAGE RESOLUTION | OK | 400 [DPI] | 400 [DPI] |
| TWO-SIDE PRINT ON/OFF | NG | ON | OFF |
| SORT ON/OFF | OK | ON | OFF/ON |
| PRINTING PAPER | OK | A4 | A5, A4, A3, B4, A3 |
| MAGNIFICATIONS | OK | 100 [%] | (25-400) [%] |

IMAGE PROCESSING USING RECEIVED PROCESSING CONDITIONS

BACKGROUND OF THE INVENTION

1. Field of the Invention

The present invention relates to an image processing apparatus, an image processing system, and an image processing method. More particularly, the present invention relates to an image processing apparatus, an image processing system and an image processing method, which permit cooperating operation (hereinafter referred to as "cooperation") of a plurality of image input/output units having image data input and/or output functions.

2. Description of the Related Art

It has conventionally been a usual practice to reduce total processing time by causing a plurality of units to cooperate to perform simultaneous operations in parallel, in addition to performing a single operation by means of a single unit. In order to perform simultaneous parallel operations of a plurality of units as described above, it is advantageous to have a host computer which provides each unit with an instruction. In the conventional art, the processing work to be assigned to each unit has been previously calculated by the host computer, and the individual units (input/output units) perform processing only passively in accordance with an instruction given by the host computer.

However, there are problems in the conventional art in which a plurality of units cooperate to perform simultaneous operations in parallel as described above, and passively carry out processing work in accordance with an instruction provided by the host computer.

More specifically, when a cooperating unit from among the plurality of units does not support a given process (for example, setting of printing on two sides or setting of image processing parameters), processing may then be prevented. Consequently, it has often been inevitable to cause a single unit to carry out a single processing work. Even in such a case, it is not easy for a user having set the processing to have accurate information about details of the trouble. Further, in order to determine what settings should be tried again to achieve cooperation, complicated confirming operations are required, thus making the user operations more complicated.

SUMMARY OF THE INVENTION

The present invention was developed in view of the circumstances described above, and has as an object to provide an image processing apparatus, an image processing system and an image processing method which permit reduction of cost and maintenance workload by causing a plurality of devices to cooperate to perform simultaneous parallel operations, and to reduce the total processing time.

The invention also provides an image processing apparatus, an image processing system and an image processing method, which enable the user, upon causing a plurality of units to cooperate to achieve simultaneous parallel operation, to have accurate information about any conditions which prevent continued cooperation.

More particularly, the invention provides an image processing apparatus for processing image information transferred from another device connected to a communication line, comprising: receiving means for receiving image processing conditions from the other device; processing means for processing image information transferred from the other device in accordance with the image processing conditions received by the receiving means; and transmitting means for transmitting, when image processing is inexecutable under the image processing conditions received by the receiving means via the processing means, executable image processing conditions in place of the received processing conditions.

Further, the invention provides an image processing apparatus for processing image information transferred from another device connected to a communication line, comprising: receiving means for receiving image processing conditions from the other device, including a plurality of image processing instructions; processing means for processing the image information transferred from the other device in accordance with the plurality of image processing instructions included in the image processing conditions received by the receiving means; determining means for determining whether or not image processing by the processing means is possible in accordance with each of the plurality of image processing instructions included in the image processing conditions received by the receiving means; and transmitting means for transmitting a response indicating an executable image processing instruction in accordance with the result of determination of the determining means.

In addition, the invention provides an image processing apparatus which transfers image information to another device connected to a communication line, and processes the same by means of the other device, where the apparatus comprises: transmitting means for transmitting image processing conditions to the other device; receiving means for receiving, when image processing is inexecutable under the image processing conditions transmitted by the transmitting means by the other device, executable image processing conditions in place of the transmitted image processing conditions; and a displaying means for displaying alternative image processing conditions received by the receiving means.

The invention also provides an image processing apparatus which transfers image information to another device connected to a communication line, and processes the same by means of the other device, where the apparatus comprises: transmitting means for transmitting image processing conditions including a plurality of image processing instructions to the other device; receiving means for receiving a response showing whether or not image processing in accordance with each of the plurality of image processing instructions included in the image processing conditions transmitted by the transmitting means is executable by the other device; and displaying means for displaying whether or not image processing in accordance with each of the plurality of image processing instructions is executable in compliance with the response received by the receiving means.

The objects and effects of the invention as described above and other objects and effects of the invention will be more apparent from the following description.

BRIEF DESCRIPTION OF THE DRAWINGS

FIG. 5 is a descriptive view illustrating parameters to be set for the use for the cooperating operations in the image processing system of the first and second embodiments of the invention;

FIG. 19 is a descriptive view illustrating an example of a display notifying a user of causes of trouble during cooperation in the image processing system in the second embodiment of the invention.

DESCRIPTION OF THE PREFERRED EMBODIMENTS

Figure 1:
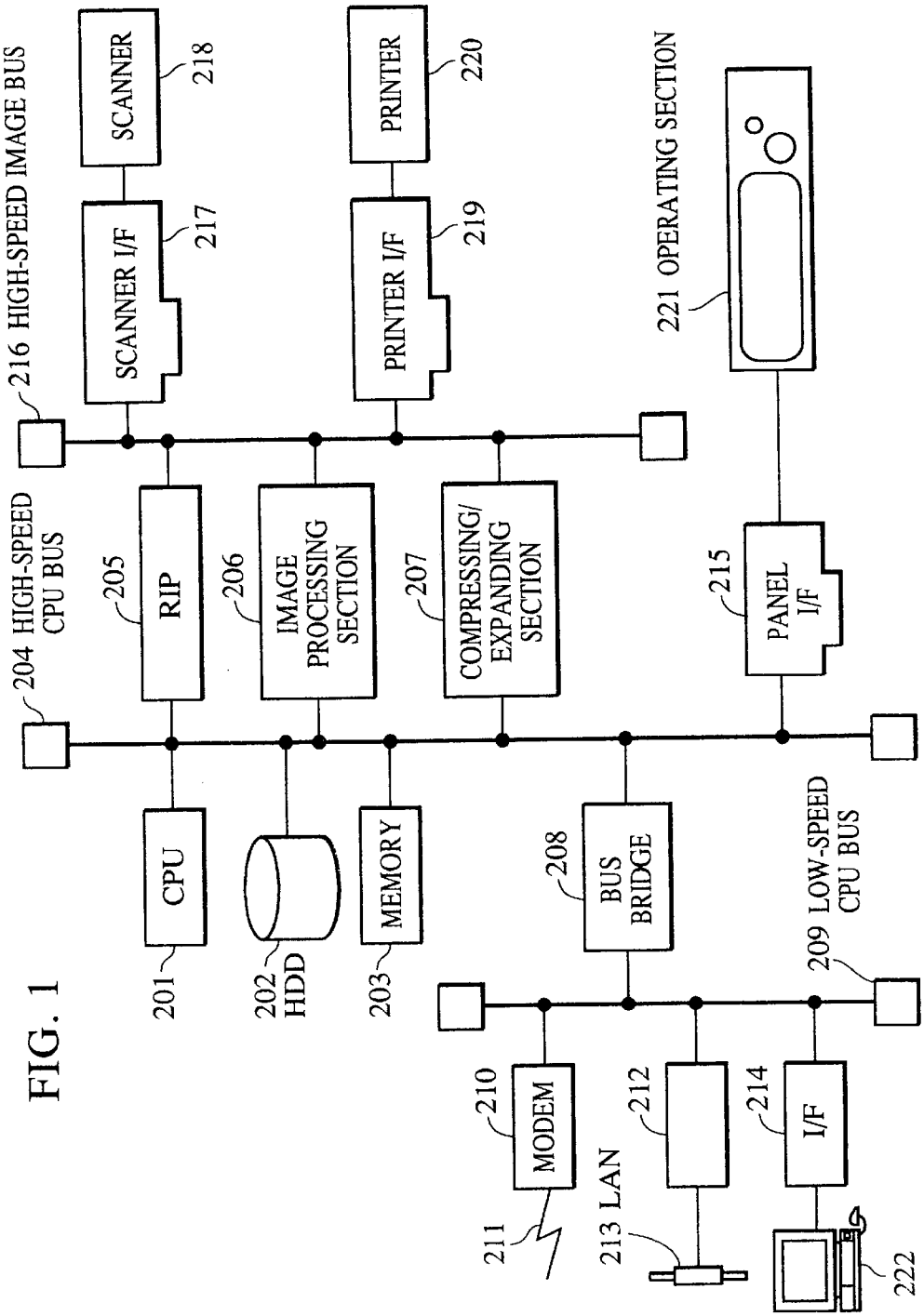
FIG. 1 is a block diagram illustrating a configuration of a portion common to the individual units of an image processing system in the first and second embodiments of the present invention.

Embodiments of the present invention will be described below with reference to the drawings.

[1] First Embodiment

First, the overall configuration of an image processing system in a first embodiment will be described with reference to FIG. 2. The image processing system is a system in which a host computer (PC), copy machines and printer units are connected on a single network. More specifically, a PC 101, a copy machine 107, another copy machine 108, a printer unit 109 and another printer unit 110 are connected on a network (hereinafter referred to as "LAN") 112. The image processing system configuration is not limited to the one shown in FIG. 2, but may as required include a scanner unit or a facsimile machine connected on the LAN 112, in addition to the devices enumerated above.

The PC 101 is a computer usually controlled by the user, and prepares documents and exchanges electronic mail with other computers connected to the LAN 112. The copy machine 107 is an image forming apparatus which has, for example, a large-sized liquid crystal touch panel and is simultaneously provided with a scanner function and a printer function. Further, the copy machine 107 has a printer function for a computer or the like, receiving a document prepared by the PC 101 via the LAN 112, exploding image forming command data into bit map image data for printing, and receiving image data read out by the scanner function section of the copy machine 108 via the LAN 112. Similar functions are performed by the copy machine 108.

The printer unit 109 receives, like the copy machines 107 and 108, a document or the like prepared by the PC 101 via the LAN 112, exploding image forming command data into bit map image data for printing, and receiving image data read out by the scanner function section of the copy machine 107 or 108 via the LAN 112. This is also the case with the printer unit 110.

The configuration of the common portions of the individual image forming apparatuses in the image forming system of the first embodiment of the invention will now be described with reference to FIG. 1. It is needless to mention that components necessary for functions of the individual image forming apparatuses are selected. The portion common to all the image forming apparatuses comprises a CPU 201, an HDD (hard disk) 202, a memory 203, a high-speed CPU bus 204, an RIP (Raster Image Processor) 205, an image processor 206, a compressing/expanding section 207, a bus bridge 208, a low-speed CPU bus 209, a modem 210, a LAN 212, a manager interface 214, a panel interface 215, a high-speed image bus 216, a scanner interface 217, a scanner unit 218, a printer interface 219, a printer unit 220, and an operating section 221.

Details of the functions of the components described above are as follows. The CPU 201 is a microprocessor controlling the entire image forming apparatus, and operates in conformity with a real-time OS (operating system for real-time processing). The HDD 202 is a large-capacity hard disk for storing a plurality of applications for ensuring operations of the CPU 201, under control of the CPU 201. Programs corresponding to the flowcharts, shown in FIGS. 6 to 10 and 12 to 16 described later, to be executed by the CPU 201 are stored in the HDD 202. The memory 203 is a work memory for enabling the CPU 201 to operate, and permits high-speed access from the CPU 201.

The high-speed bus 204 is a bus for connecting the aforesaid CPU 201, HDD 202, memory 203 and the individual functional units described later, for transferring data processed by the CPU 201 to the individual functional units, and for transferring at a high speed (Direct Memory Access: DMA transfer) data between the individual functional units. Generally applicable buses include a VL bus (VESA Local Bus; data transfer rate: 32 MHz) and a PCI bus (Peripheral Component Interconnect: bus specifications proposed by Intel Company, United States; capable of transferring up to 133 Mbytes per second).

The RIP 205 is a functional unit which receives an image forming command entered from an external interface connected to a computer (described later), and applies a conversion to a bit map image in response to the contents of the received command. The image forming command is entered from the high-speed CPU bus 204, and provides an output of an image to a high-speed image bus 216 (also described later). Applicable RIPs include Post Script (a page describing language developed by Adbec Company, United States), PCL (a page describing language), LIPS (LBP Image Processing System: a page describing language developed by Canon Inc.), and CaPSL (a page describing language).

The image processing section 206 is a functional unit performing filtering operations of an image, such as smoothing and edging, in accordance with a processing command issued by the CPU 201 for an image entered from the high-speed image bus 216. Other functions of the image processing section 206 include character recognition (OCR: Optical Character Reader) of an image entered from the high-speed image bus 216, and an image separating function of separating a character portion from an image portion.

The compressing/expanding section 207 compresses the image entered from the high-speed image bus 216 by any of several image compressing methods, such as MH (Modified Huffman: a data compressing/expanding method), MR (Modified READ: a facsimile coding method), MMR (Modified Modified READ: a data compressing/expanding method), JPEG (Joint Photographic Experts Group: a compressing method of a color still image based on the same structure) and the like. This section 207 has functions of sending the thus compressed data to the high-speed CPU bus 204 or to the high-speed image bus 216 again, or expanding, on the contrary, the compressed data entered from these two buses in accordance with the method used for compression and transmitting the thus expanded data to the high-speed image bus 216.

The bus bridge 208 is a bus bridge controller for connecting the high-speed CPU bus 204 and the low-speed CPU bus 209 (described later), and absorbs the difference in processing speed between the buses. Accordingly, it is possible for the CPU 201 operating at a high speed to access the functional units operating at a low speed, connected to the low-speed CPU bus 209. The low-speed CPU bus 209 has a bus configuration with a transfer rate lower than that of the high-speed CPU bus 204, and to which functional units having a relatively low rate of processing are to be connected. In general, an ISA bus is used as the low-speed bus (Industry Standard Architecture: a standard bus for an IBM BC AT-compatible personal computer).

The modem 210 is a functional unit located between a public line 211 and the low-speed CPU bus 209, and has functions of modulating digital data received from the low-speed CPU bus 209 so as to permit sending to the public line 211, and converting the modulated data received from the public line 211 into digital data capable of being processed in the image forming apparatus. The LAN 212 is a functional unit for connecting the image forming apparatus to the local network, and performs data transmission and receiving with the local network. The Ethernet (a LAN with a bus structure jointly developed by US Xerox, DEC and Intel) is applicable to perform these functions. In FIG. 1, 213 is a LAN connected to the LAN 212.

The manager interface 214 is a functional unit for connecting the image forming apparatus and a managing unit 222. It is used for sending a control command from the image forming apparatus to the managing unit 222, or for returning an enable signal from the managing unit 222 to the image forming apparatus. The panel interface 215 provides a site where various control signals are exchanged with the operating section 221 in the image forming apparatus. This operating section communicates a signal of an input switch such as a key (described later) arranged in the operating section 221 to the CPU 201, and conducts resolution conversion for displaying image data prepared by the RIP 205, the image processing section 206 and the compressing/expanding section 207 to a liquid crystal display (described later) arranged in the operating section 221.

The high-speed image bus 216 connects image input/output buses in various image forming units (RIP 205, the image processor 206 and compressing/expanding section 207) to the scanner interface 217 and the printer interface 219 (described later). The high-speed image bus 216 is not controlled by the CPU 201, but by the bus controller for data transfer. The scanner unit 218 is a visual image reader provided with an automatic original feeder, and has an RGB 3-line CCD color sensor or a single-line CCD color sensor. The scanner interface 217 transfers image data read out by scanner unit 218 to the high-speed image bus 216.

The scanner interface 217 has functions of applying an appropriate binarization to the image data read out by the scanner unit 218 depending upon contents of processing in the subsequent process, performing a serial-parallel conversion in accordance with the data width of the high-speed image bus 216, and converting read-in RGB color data into CMYBk data. The printer unit 220 prints out the image data received from the printer interface 219 in the form of visual image data on recording paper. Printers applicable as the printer unit 220 include a bubble-jet printer which prints out data on the recording paper using the bubble jet method, and a laser beam printer based on electrophotography which forms an image on a photosensitive drum by using a laser beam and then forms the image on the recording paper. The laser beam printer may be a monochromatic laser beam printer or a color laser beam printer based on CMYBk.

The printer interface 219 transfers image data received from the high-speed image bus 216 to the printer unit 220, and has a bus width converting function of converting the bus width of the high-speed image bus 216 to a bus width in accordance with the gradation of the printer, and a function of absorbing a difference between the printing rate of the printer and the transfer rate of image data of the high-speed image bus 216. The operating section 221 has, for example, a liquid crystal display section, a touch panel input unit provided on the liquid crystal display section, and a plurality of hard keys. A signal entered via the touch panel or the hard keys is communicated via the above-described panel interface 215 to the CPU 201. The liquid crystal display section displays the image data received from the panel interface 215. The functions available in the operation of the image forming apparatus and image data are displayed on the liquid crystal display.

Figure 3:
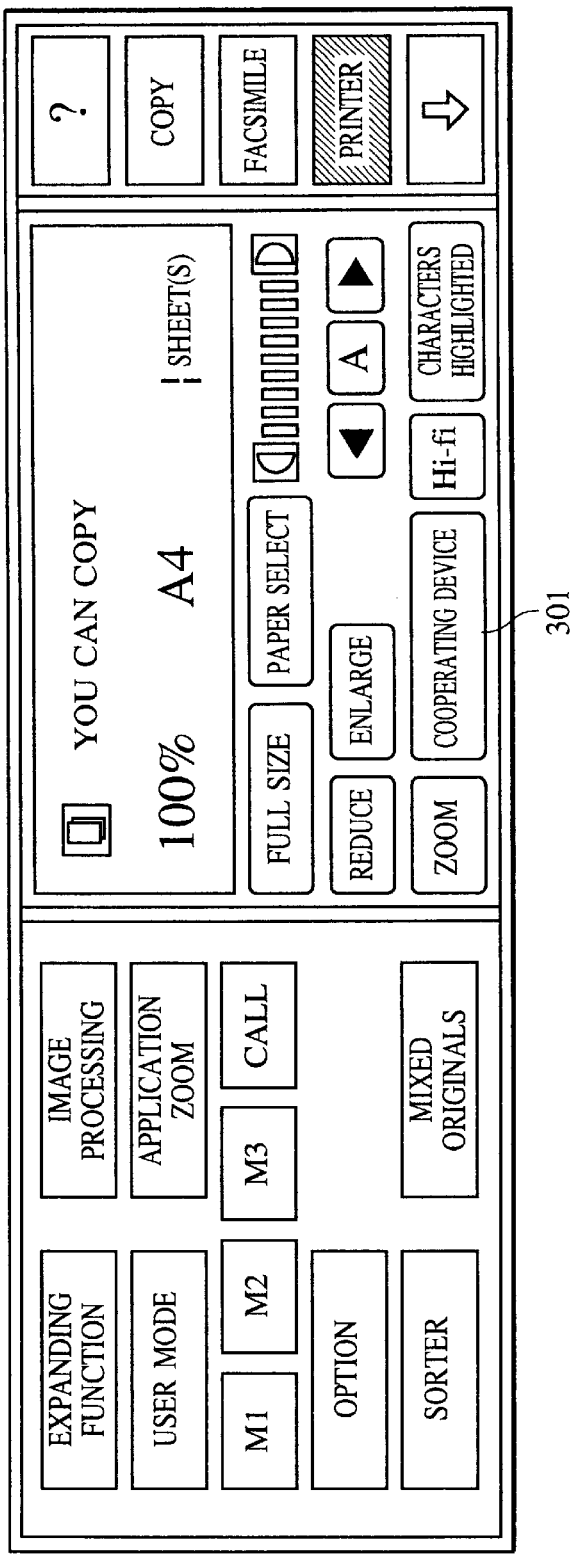
FIG. 3 is a front view illustrating a configuration of a user interface section of a copy machine of the image processing system of the first and second embodiments of the invention.
Figure 4:
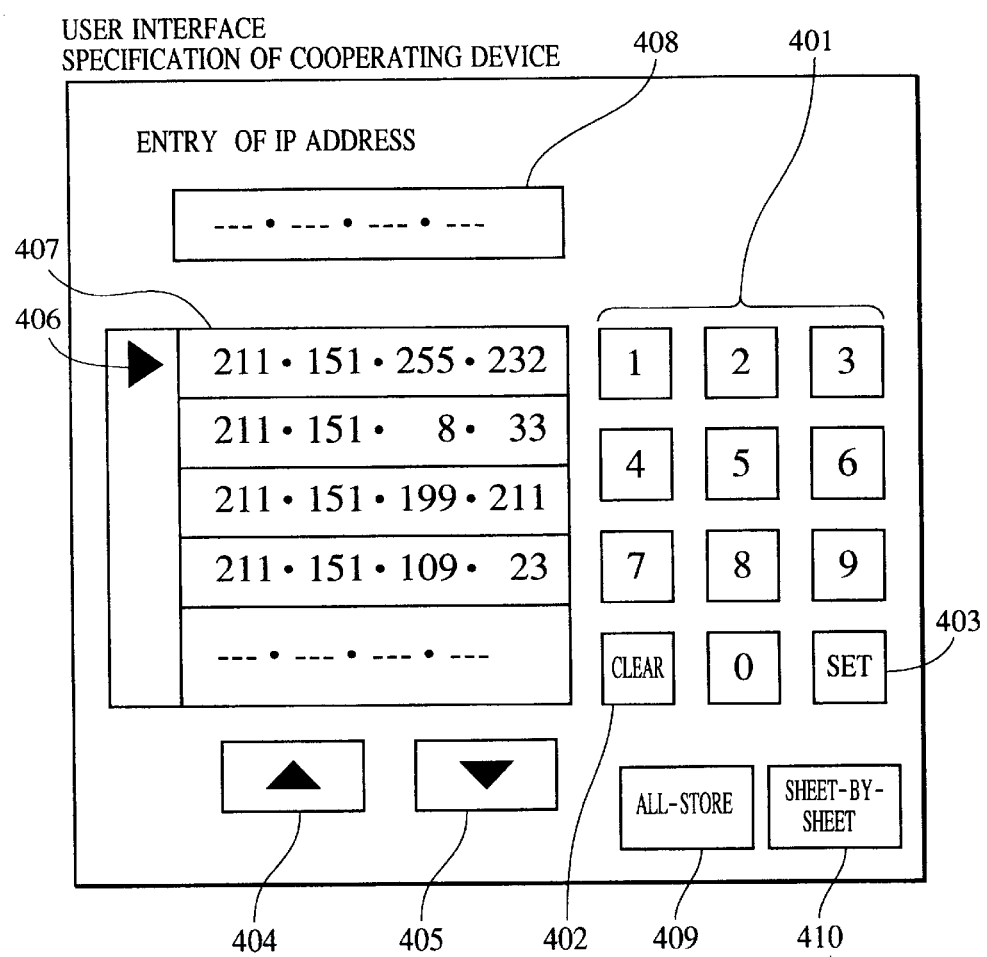
FIG. 4 is a descriptive view illustrating the configuration of the user interface section of the copy machine of the image processing system of the first and second embodiments of the invention.

Cooperating copying operations of the copy machines 107 and 108 in the image processing system of the first embodiment will now be described. FIG. 3 illustrates the configuration of the user interface section of the copy machines 107 and 108. Various modes necessary for copying are set through key operation. To cause cooperating operation with other devices connected to the LAN 212, the operator presses a cooperating device setting key 301. When the cooperating device setting key 301 is pressed, the display is switched over to a user interface screen as shown in FIG. 4. Setting of various other modes is the same as that in a case not involving cooperation.

A cooperating device (hereinafter referred to as an external cooperating device) is selected through specification of an IP (Internet Protocol) address used for network protocol/management. An IP address has always a one-to-one corresponding relationship on a network, so that specification of an IP address means specification of a device. An IP address may be specified either by the user pressing keys on the keypad shown in FIG. 4, or from a previously registered list 407. For each pressing of any of the ten keys 401, a numeral is displayed on the display unit 408 to permit configuration of input thereof. When selecting from the list 407, the cursor 406 is brought to the target IP address. The cursor 406 is moved by pressing an up-key 404 or a down-key 405.

In the case of the ten keys 401 as well as in the case of the list 407, it is possible to cancel the current input, or specify the IP address by pressing the clear key 402. Specification of an IP address is established by pressing the set key 403. When once storing all the image in the HDD 202 or the memory 203 by scanning all the originals, and then providing an output thereof, specification is given by pressing an "all store" key 409. When conducting an output operation for every scanning of an original, on the other hand, the IP address should be specified by pressing the sheet-to-sheet key 410. When it is intended to use the original shortly after storing in some other operation, the all-store operation would be specified because of a more rapid read-in of the original. When the user desires a wide range of selection in modifying the process specification (which would be advantageous if, for example, difficulty in processing were expected), the sheet-by-sheet specification permitting monitoring of the progress of processing would be conducted.

Adjustment of ability and setting of operations should be made between the devices to ensure cooperation. Examples of these parameters to be set are shown in FIG. 5. The device instructed to perform cooperation communicates with an external cooperating device corresponding to the IP address specified in FIG. 4, and requests the external cooperating device for processing in compliance with the information shown in FIG. 5. In FIG. 5, 501 is a number of output sheets to be provided by the external cooperating device; 502 is a size of an output image; 503 is the resolution of an image; 504 is an instruction as to whether or not two-side printing is to be done; 505 is an instruction as to whether or not sorting is to be carried out; 506 is an instruction as to which paper form is to be used; and 507 is a magnification setting for enlargement or size reduction. The information about these parameters is to be passed to the external cooperating device, in accordance with the information provided by the user, by the apparatus instructed to carry out a cooperating operation.

Figure 6:
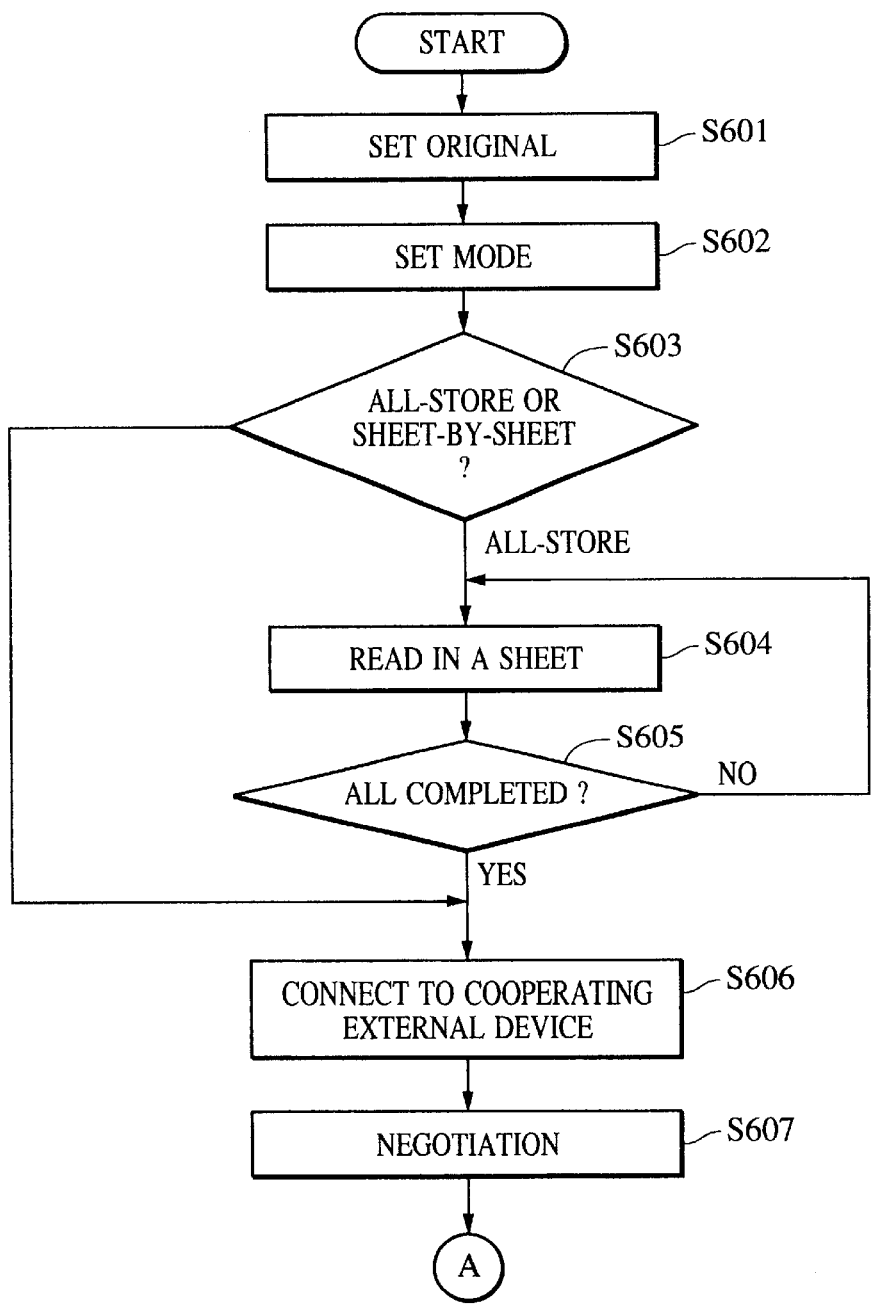
FIG. 6 is a flowchart illustrating processing by a device instructed to perform cooperation in the image processing system of the first embodiment of the invention.
Figure 7:
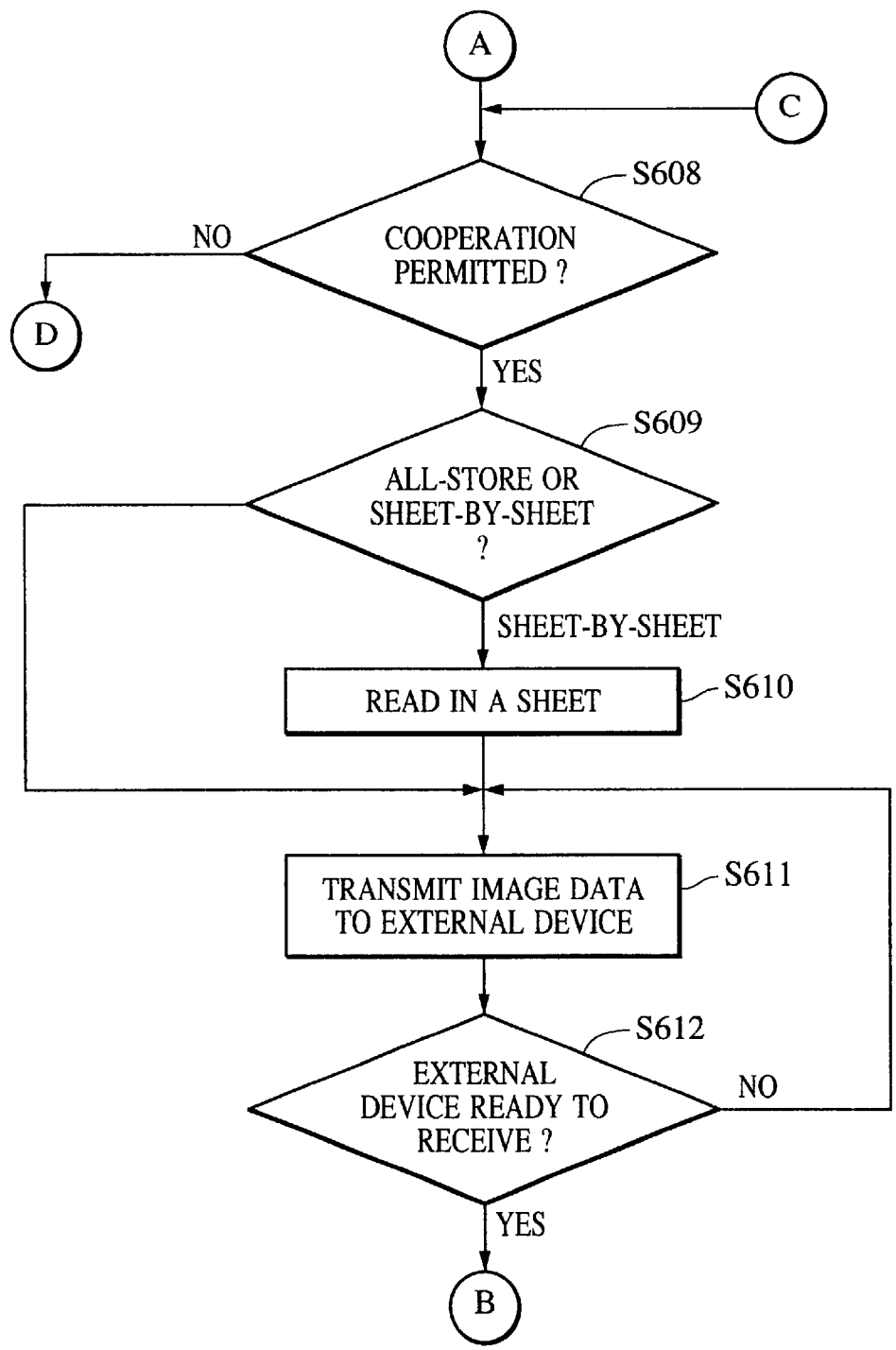
FIG. 7 is a flowchart illustrating processing by the device instructed to perform cooperation in the image processing system of the first embodiment of the invention.
Figure 8:
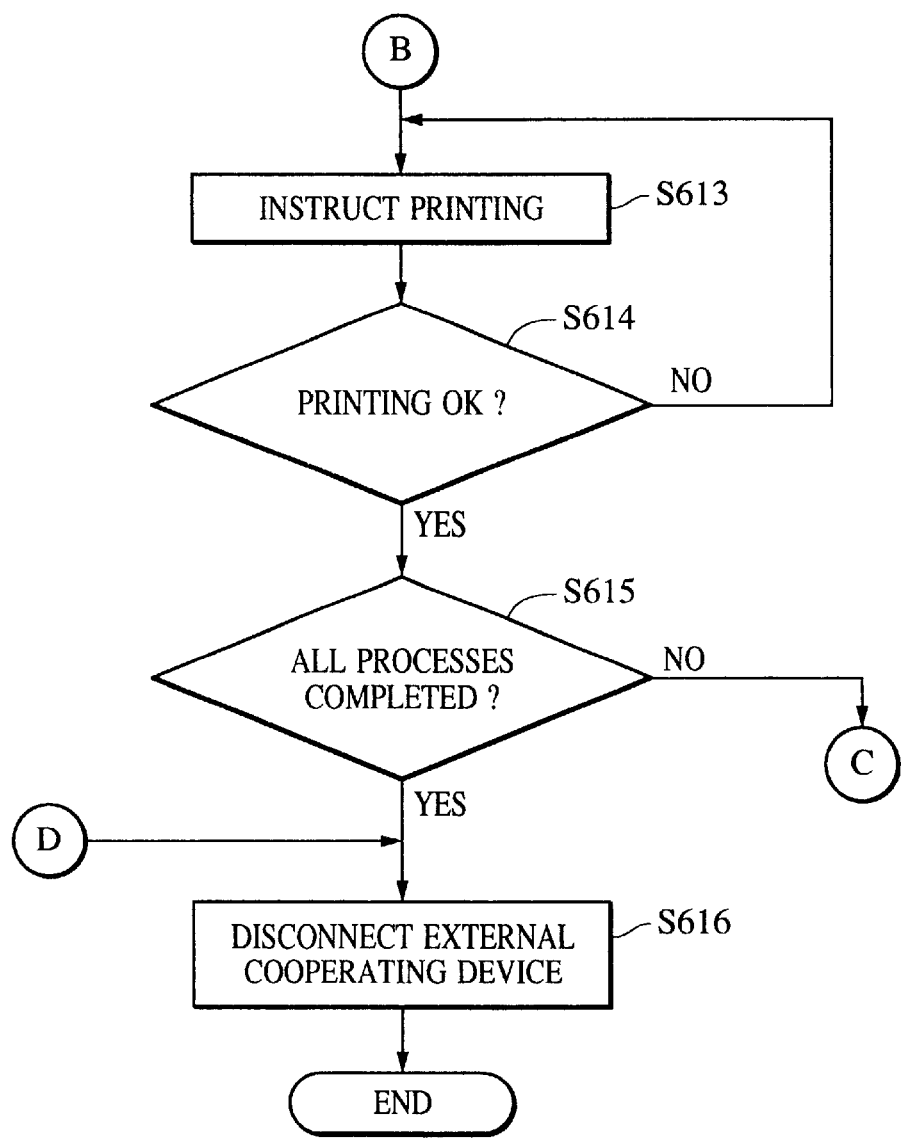
FIG. 8 is a flowchart illustrating processing by the device instructed to perform cooperation in the image processing system of the first embodiment of the invention.

Processing by the device instructed by the user to conduct cooperation of the image processing system in the first embodiment of the invention will now be described with reference to FIGS. 6 to 8. First, the user sets the original in the scanner unit 218 (step S601). Then, various parameters shown in FIGS. 3 and 4 set by the user are received (step S602). Along with this, all of the original (set in the aforesaid step S601) is read in. It is then determined whether output is performed after once storing all image data in the HDD 202 or the memory 203, or output is carried out every read-in of the original, according to user's specification shown in FIG. 4 (step S603).

When "all-store" is instructed, a sheet of the original is scanned for read-in (step S604), and stored in the HDD 202 or the memory 203. It is then determined if there is a further original to be read in or not (step S605). If there is, the process returns to the aforesaid step S604 and the cycle of steps is repeated. If not, or when the sheet-by-sheet mode is specified in step S603, connection is made with the external cooperating device specified in FIG. 4 prior to reading-in of the original (step S606). After connection, negotiations are performed to determine whether or not cooperation is permitted, on the basis of the various pieces of information illustrated in FIG. 5 (step S607).

This is followed by a determination as to whether or not cooperation is possible (step S608). When cooperation is not possible, the external device is disconnected (step S616) to discontinue processing. When cooperation is possible, a determination is again made as to all-store or sheet-by-sheet (step S609). When sheet-by-sheet is instructed, an original is scanned (step S610). When an original has been scanned, or when all-store is instructed in the foregoing step S609, image data are transmitted to the external cooperating device (step S611). Then, proper receipt of the image data by the external cooperating device is confirmed (step S612).

When the external cooperating device fails to receive the image data, the process is returned back to step S611 to try again to transmit the image data. When the external cooperating device has properly received the image data, the received image data are subjected to printing on a printer of the external cooperating device (step S613). Then, it is determined whether or not printing has been properly completed (step S614). When the printer has failed to complete proper printing, another attempt is made to perform printing. When printing has properly been conducted, it is determined whether or not all printing operations have been completed (step S615). When there remain originals or image data still to be processed, the process returns to the aforesaid step S608 to repeat the cycle of steps as described above. When it is determined that all the steps have been completed, the external cooperating device is disconnected (step S616) to complete the process.

Figure 9:
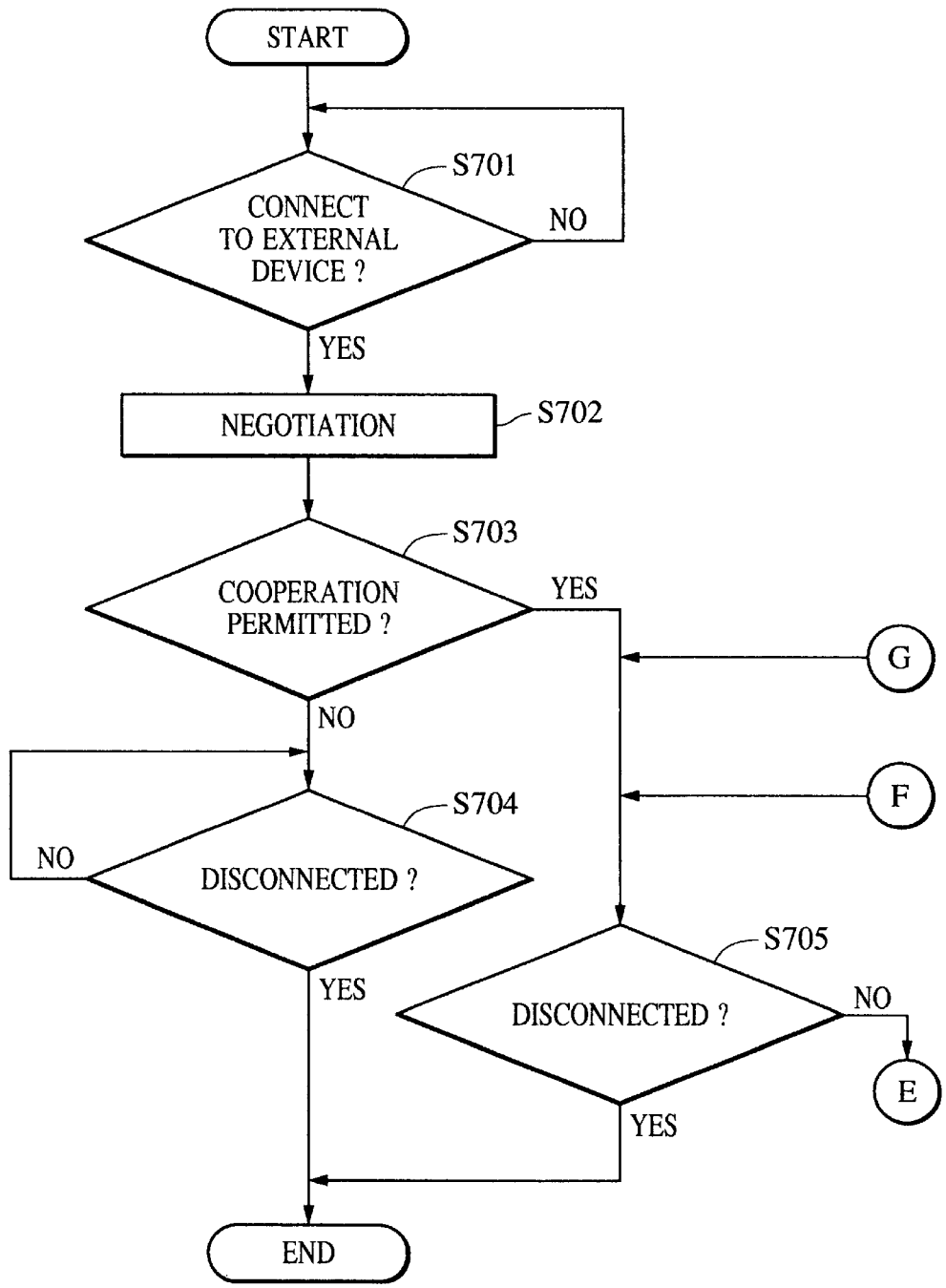
FIG. 9 is a flowchart illustrating processing by an external cooperating device in the image processing system in the first embodiment of the invention.
Figure 10:
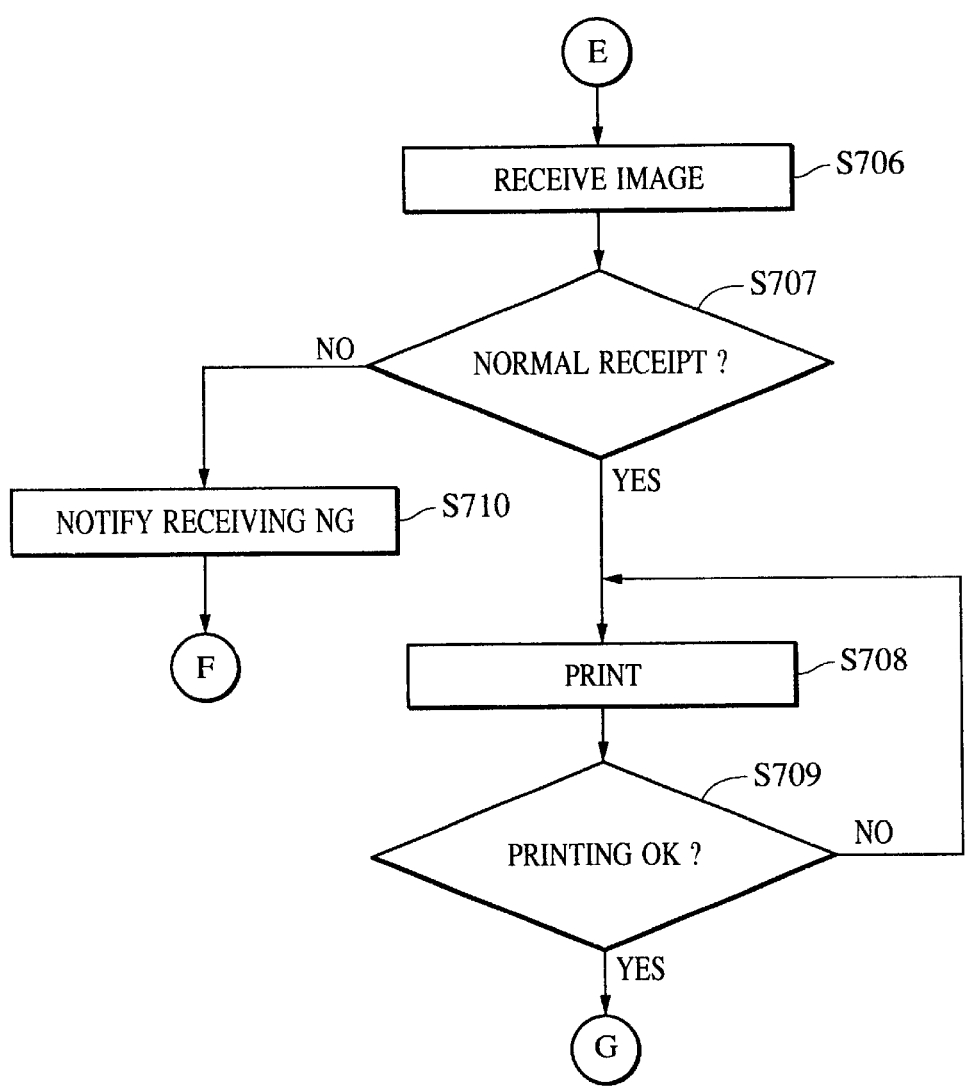
FIG. 10 is a flowchart illustrating processing by an external cooperating device in the image processing system in the first embodiment of the invention.

Processing by the external cooperating device for the image processing system of the first embodiment of the invention will now be described with reference to FIGS. 9 and 10. First, it is determined whether or not there is a connection request from outside (step S701). When there is a connection request, negotiations are made to determine whether or not cooperation is possible (step S702). At this point, various pieces of information, described above in the discussion of FIG. 5, are received via the LAN 212. As a result, it is determined whether or not cooperation in conformity with the foregoing various pieces of information is possible (step S703). When cooperation is impossible, a notice to that effect is given, and waiting for disconnection (step S704), processing comes to an end. When cooperation is possible, it is determined whether or not disconnection has occurred (step S705).

When connection is broken, the processing is completed. When the connection is not broken, the image data are received (step S706), and it is determined whether or not the image data was normally received (step S707). When the image data was not normally received, a notice to that effect is given to the counter-part device (step S710), and the steps beginning with step S705 are followed again. When the image data have been properly received, the received image data are subjected to printing (step S708). It is then determined whether or not printing has been properly conducted (step S709). If the printer has failed to perform printing, printing in step S708 is executed again. When printing has properly been performed, it is determined whether or not there is disconnection at step S705, and the following steps are repeated.

Figure 11:
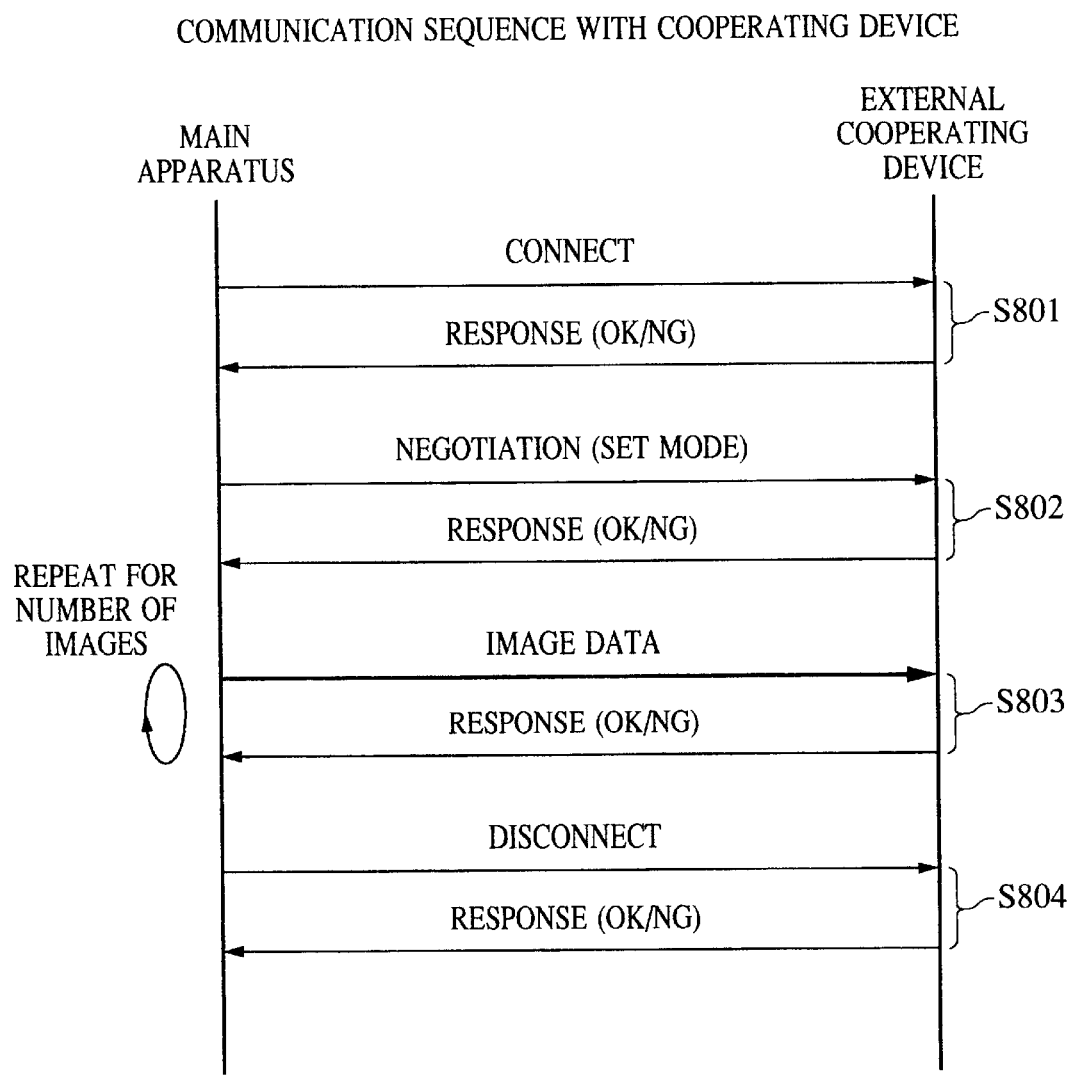
FIG. 11 is a descriptive view illustrating a communication sequence between the main apparatus and the external cooperating device instructed to execute cooperation in the image processing system in the first embodiment of the invention.

Now, in the processing described with reference to FIGS. 6 to 10, the communication sequence between the main apparatus and the external cooperating device, instructed to carry out cooperation, will be described with reference to FIG. 11. In step S801, connection is made from the apparatus side to the external cooperating device side. Then, negotiations are made in step S802, and various pieces of information for cooperation are exchanged to determine whether or not cooperation is possible. In step S803, image data are transmitted from the main apparatus to the external cooperating device. Transmission of the image data is repeated a number of times equal to the number of necessary images. In step S804, disconnection is signaled from the apparatus to the external cooperating device, thus completing communication therebetween.

According to the first embodiment of the invention, as described above, the copy machines 107 and 108 and the printers 109 and 110 composing the image processing system comprise an RIP 205 conducting image processing on the basis of the image information; an image processing section 206; a compressing/expanding section 207; a LAN 212 performing communication with the external device; an operating section 221, on which keys for entering an instruction to conduct cooperation with the external device and a display unit for display various data are arranged; and a CPU 201 for controlling the apparatus for cooperation with other device on the basis of an instruction entered from the operating section 221. As a result, it is possible to reduce the cost or maintenance workload and to reduce the total processing time by causing a plurality of devices to execute processing in parallel without providing a host computer for cooperation of a plurality of devices as in the conventional art.

[2] Second Embodiment

Figure 2:
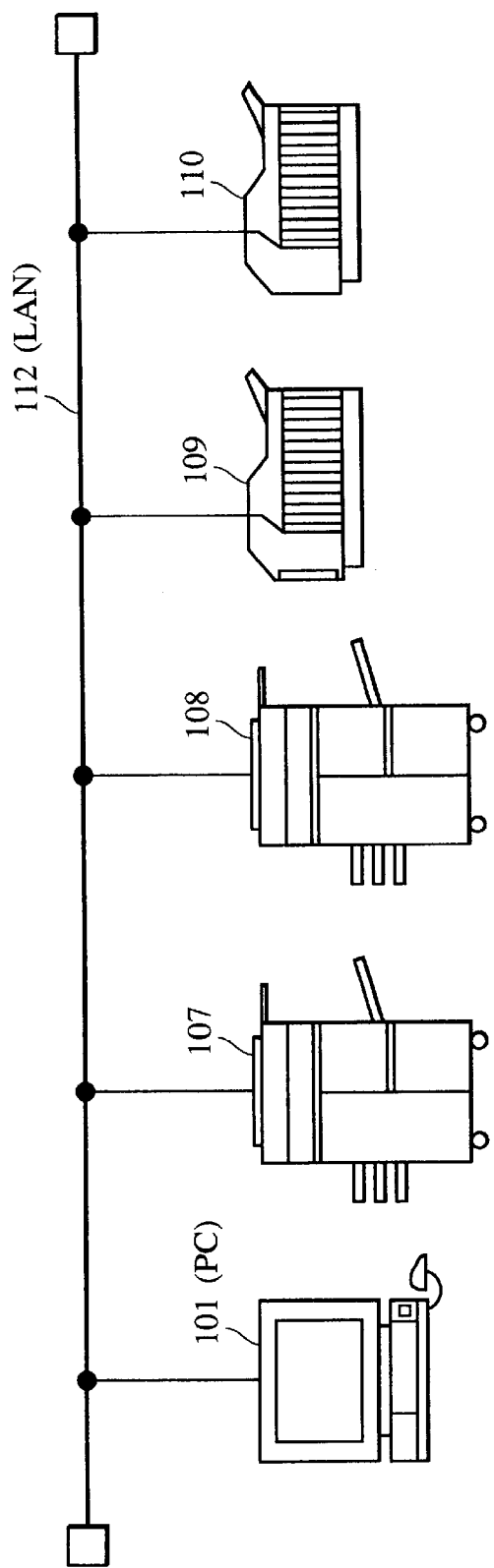
FIG. 2 is a descriptive view illustrating the overall configuration of the image processing system in the first and second embodiments of the invention.

As in the above-described first embodiment of the invention, an image processing system of a second embodiment has a configuration in which a PC 101, a copy machine 107, another copy machine 108, a printer unit 109 and another printer unit 110 are connected onto the network (LAN) 112 (see FIG. 2). These components have been described in the above discussion of the first embodiment; description thereof is omitted here. The configuration of the image processing system is not limited to that shown; for example, a scanner or a facsimile unit may as required be connected in addition to those enumerated above.

Each of the portions common to all the image forming apparatuses in the image processing system of the second embodiment comprises, as in the foregoing first embodiment, a CPU 201; an HDD (hard disk) 202; a memory 203; a high speed CPU bus 204; an RIP 205; an image processing section 206; compressing/expanding section 207; a bus bridge 208; a low-speed CPU bus 209; a modem 210; a LAN 212; a manager interface 214; a panel interface 215; a high-speed image bus 216; a scanner interface 217; a scanner unit 218; a printer interface 219; a printer unit 220; and an operating section 221 (see FIG. 1). Descriptions of the configuration of these components, already made in the discussion of the first embodiment, are omitted here.

The configuration of the user interface of the copy machines 107 and 108 of the image processing system (see FIG. 3), the configuration of the user interfaces of the copy machines 107 and 108 (see FIG. 4), the detailed parameters set for cooperation in the image processing system (see FIG. 5), and processing when carrying out cooperation for copying in the image processing system, of the second embodiment have also been described in detail as to the first embodiment. Description thereof in detail is therefore omitted.

Figure 12:
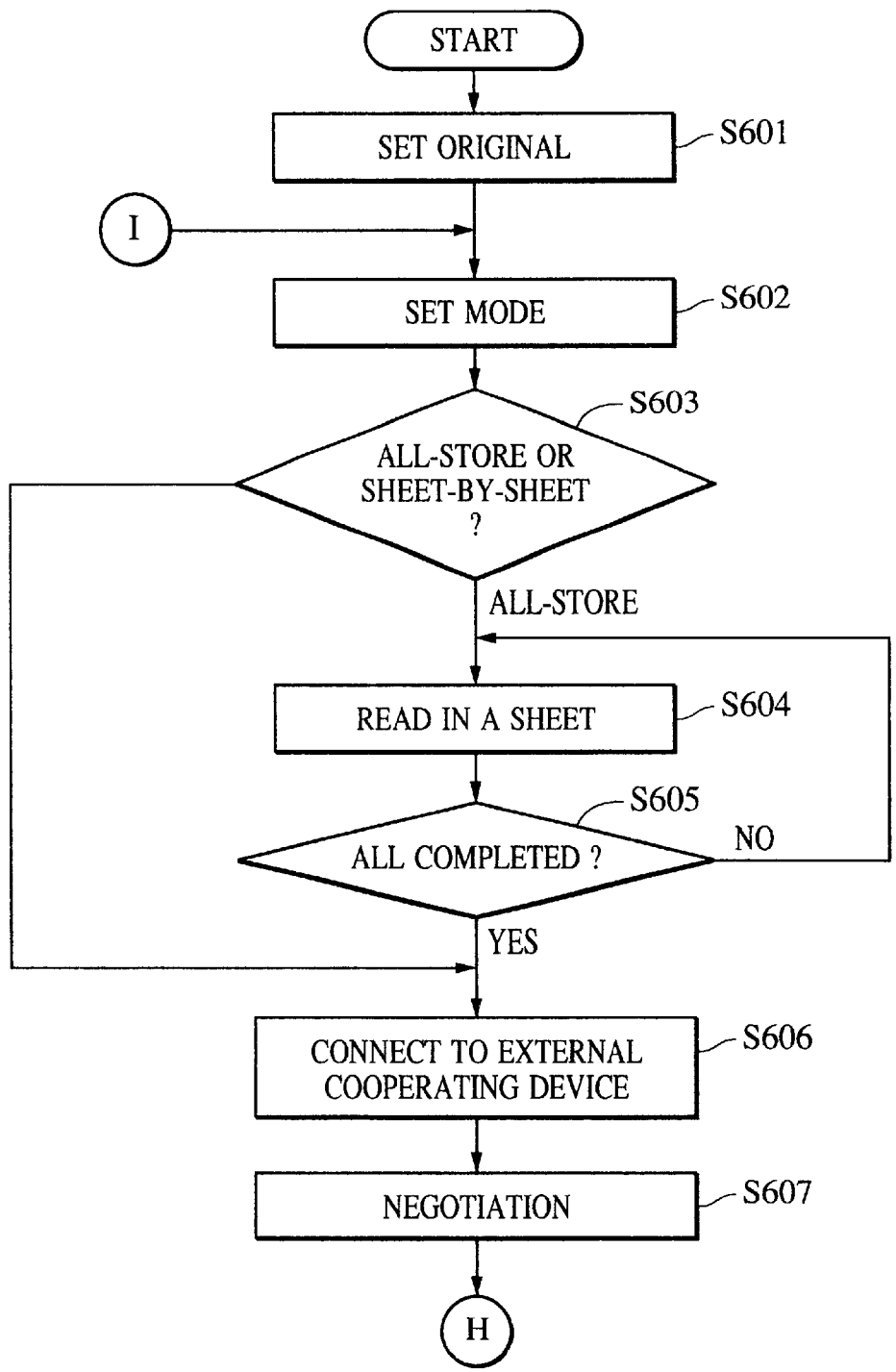
FIG. 12 is a flowchart illustrating processing by the device instructed to execute cooperation in the image processing system in the second embodiment of the invention.
Figure 13:
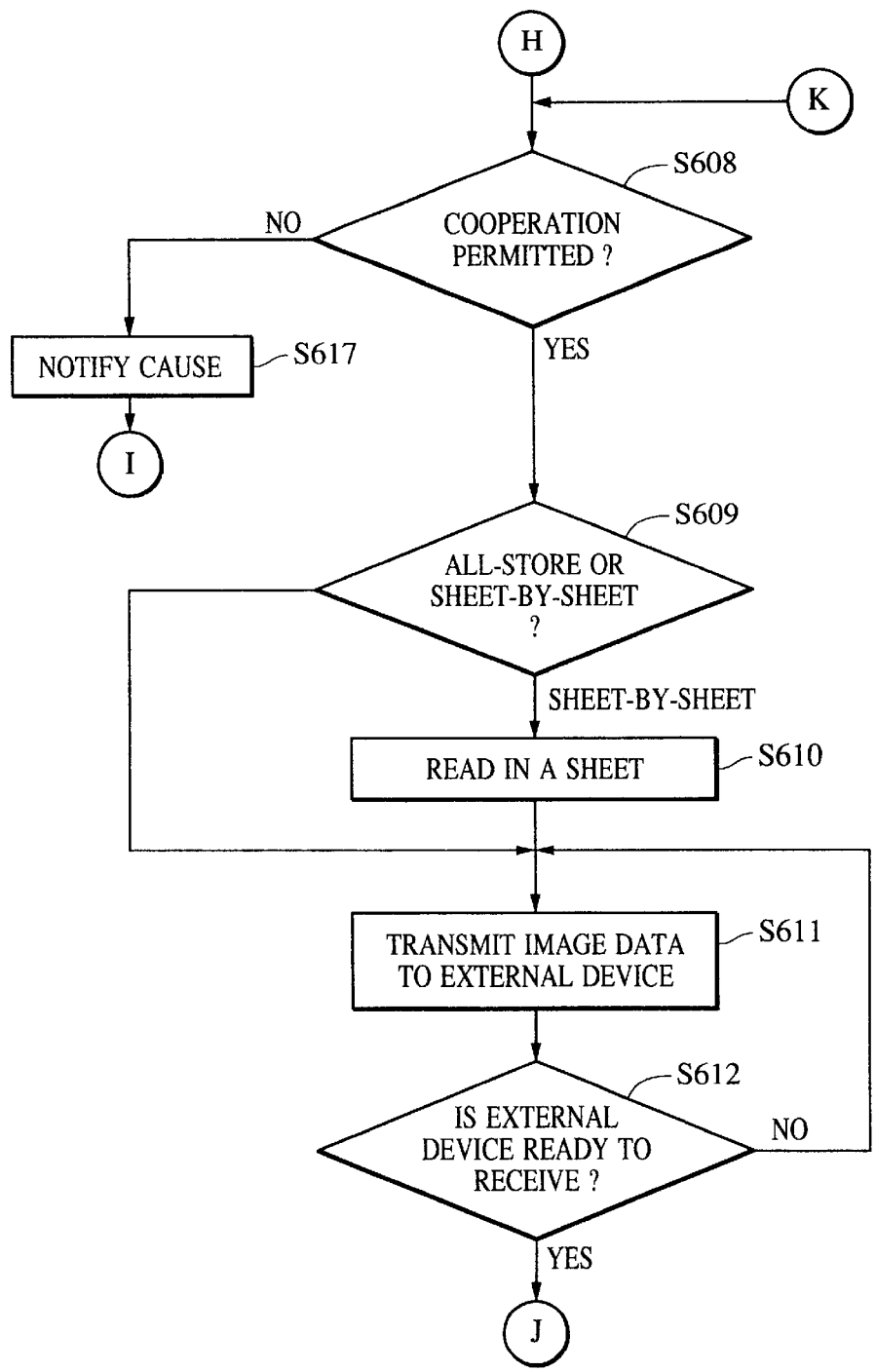
FIG. 13 is a flowchart illustrating processing by the device instructed to execute cooperation in the image processing system in the second embodiment of the invention.
Figure 14:
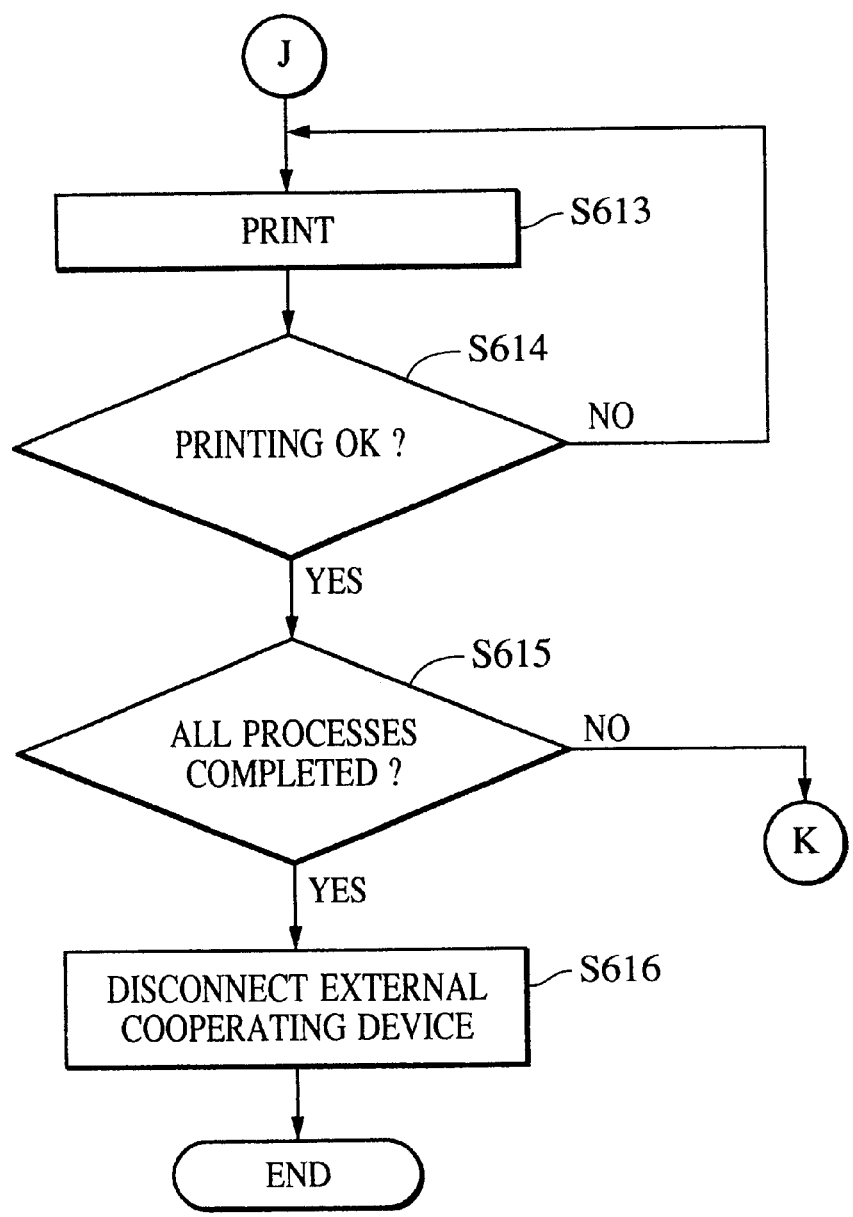
FIG. 14 is a flowchart illustrating processing by the device instructed to execute cooperation in the image processing system in the second embodiment of the invention.

Processing by the apparatus instructed by the user to conduct cooperation of the image processing system in the second embodiment will now be described with reference to FIGS. 12 to 14. The second embodiment of the invention is characterized in that processing of step S617 is added. First, the user sets originals in the scanner unit 218 (step S601).

Then, various set parameters shown in FIGS. 3 and 4 are received from the user (step S602). Along with this, all the originals set in step S601 are read in, and after once storing all image data in the HDD 202 or the memory 203, output processing is performed, or else an output is provided for every original read. The user's specification of this choice in FIG. 4 is determined (step S603).

When the all-store mode is specified, an original is read in by scanning (step S604) and stored in the HDD 202 or the memory 203. Further, it is determined whether or not there is an original to be read in (step S605). When there is an original to be read in, the process returns to step S604, and the same steps are repeated. When there is no original to be read in, or when sheet-by-sheet is specified in step S603, connection is made with the external cooperating device specified in FIG. 4 prior to read-in (step S606). After connection, negotiations are made for determining whether or not cooperation is possible on the basis of the various pieces of information described in FIG. 5 (step S607).

As a result, it is determined whether or not cooperation is possible (step S608). When cooperation is not possible, a notice to that effect is given to the user on the basis of a notice from the external cooperating device (step S617). Set values with which cooperation becomes impossible and set values acceptable for cooperation are displayed. (Details will be described later with reference to FIG. 17.) Then, the process returns to step S602, and various values set by the user are received. When cooperation is possible, it is determined again whether all-store or sheet-by sheet processing is to be executed (step S609). When sheet-by-sheet processing is specified, an original is scanned (step S610). When an original has been scanned and all-store processing is specified in step S609, the image data are transmitted to the external cooperating device (step S611). Then, proper receipt of the transmitted image data by the external cooperating device is confirmed (step S612).

When the external cooperating device has failed to receive the transmitted image data, the process returns to step S611; another attempt is made to transmit the image data. When the external cooperating device can properly receive the image data, printing is performed on the printer of the external cooperating device (step S613). Then, it is determined whether or not printing has properly been accomplished (step S614). If printing has failed, printing is performed again in step S613. When printing has been properly accomplished, it is determined whether or not all processing steps have been completed (step S615). If there still remain originals or image data to be processed, the process returns to step S608 to repeat processing. When all the processing steps have been completed, the external cooperating device is disconnected (step S616) to end the processing.

Figure 15:
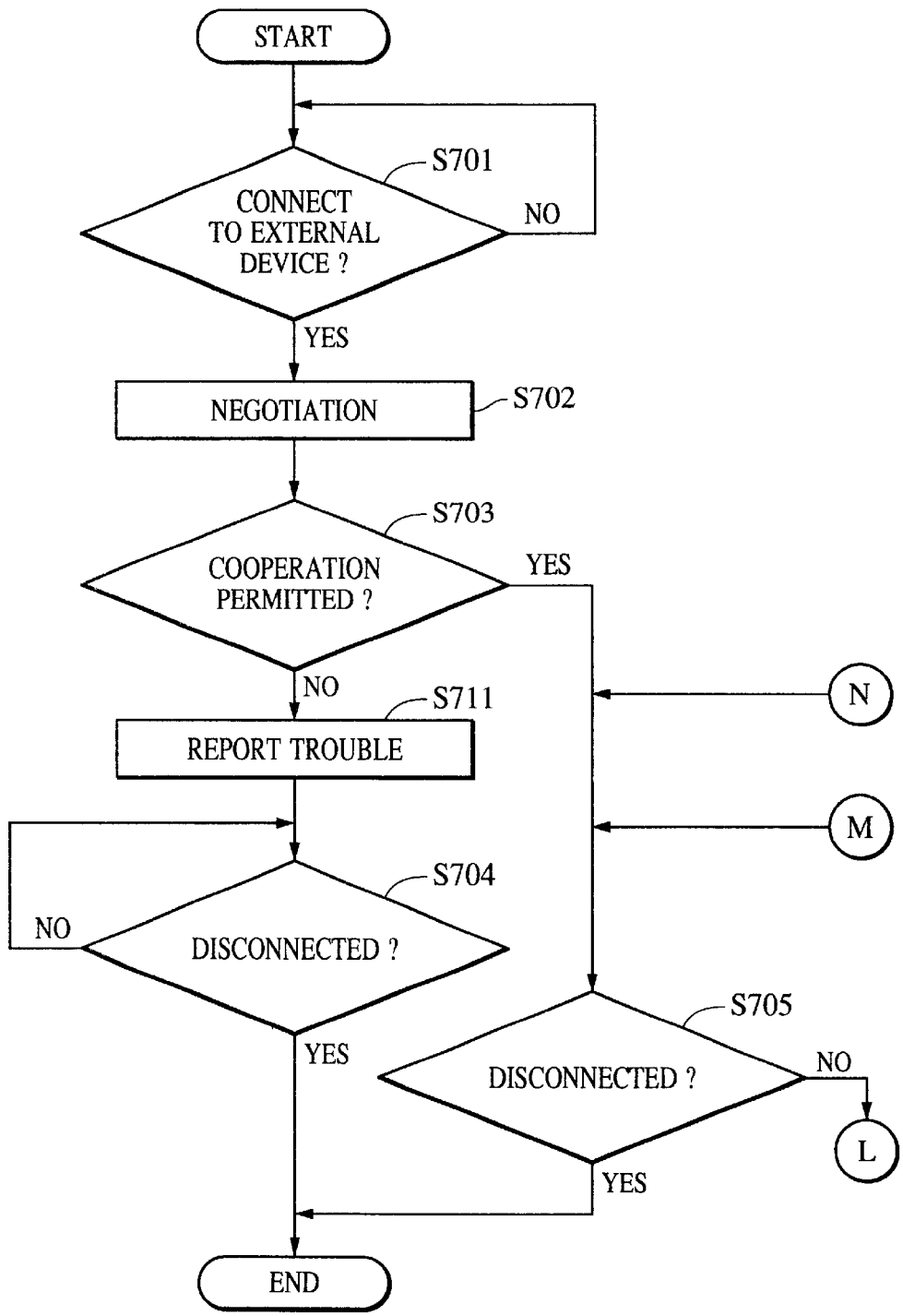
FIG. 15 is a flowchart illustrating processing by the external cooperating device in the image processing system in the second embodiment of the invention.
Figure 16:
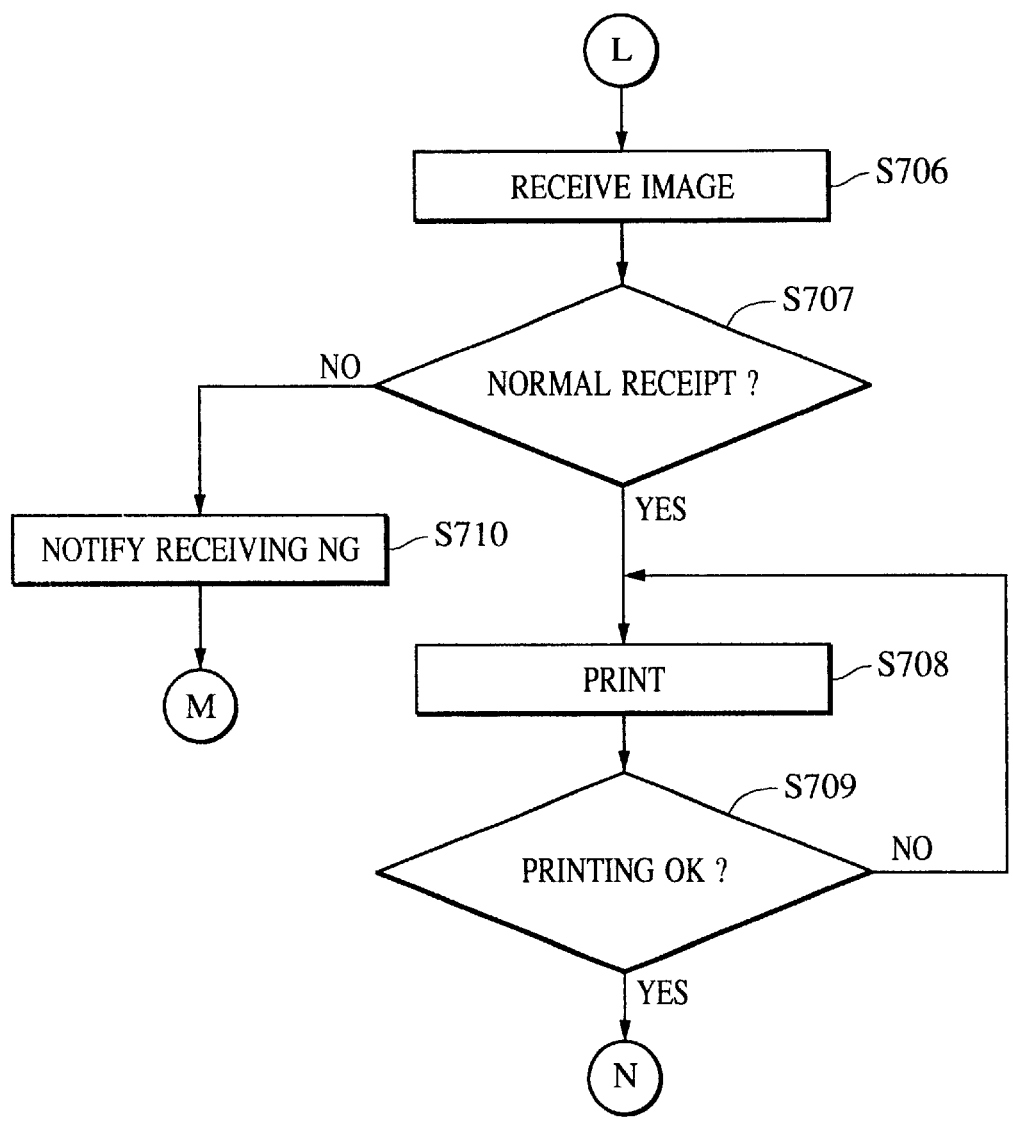
FIG. 16 is a flowchart illustrating processing by the external cooperating device in the image processing system in the second embodiment of the invention.

Processing by the external cooperating device of the image processing system in the second embodiment will now be described with reference to FIGS. 15 and 16. The second embodiment is characterized in that the process of step S711 is added. First, it is determined whether or not there is a connection request from outside (step S701). When there is a connection request, negotiations are entered into to determine whether cooperation is possible or not (step S702). At this point, the various pieces of information described above with reference to FIG. 5 are received. As a result, it is determined whether or not cooperation based on these pieces of information is possible (step S703). When cooperation is not possible, the apparatus instructed to conduct cooperation is given a notice to that effect, together with set values leading to impossibility of cooperation and values acceptable for setting for cooperation (step S711), and the processing comes to an end after disconnection (step S704).

Figure 17:
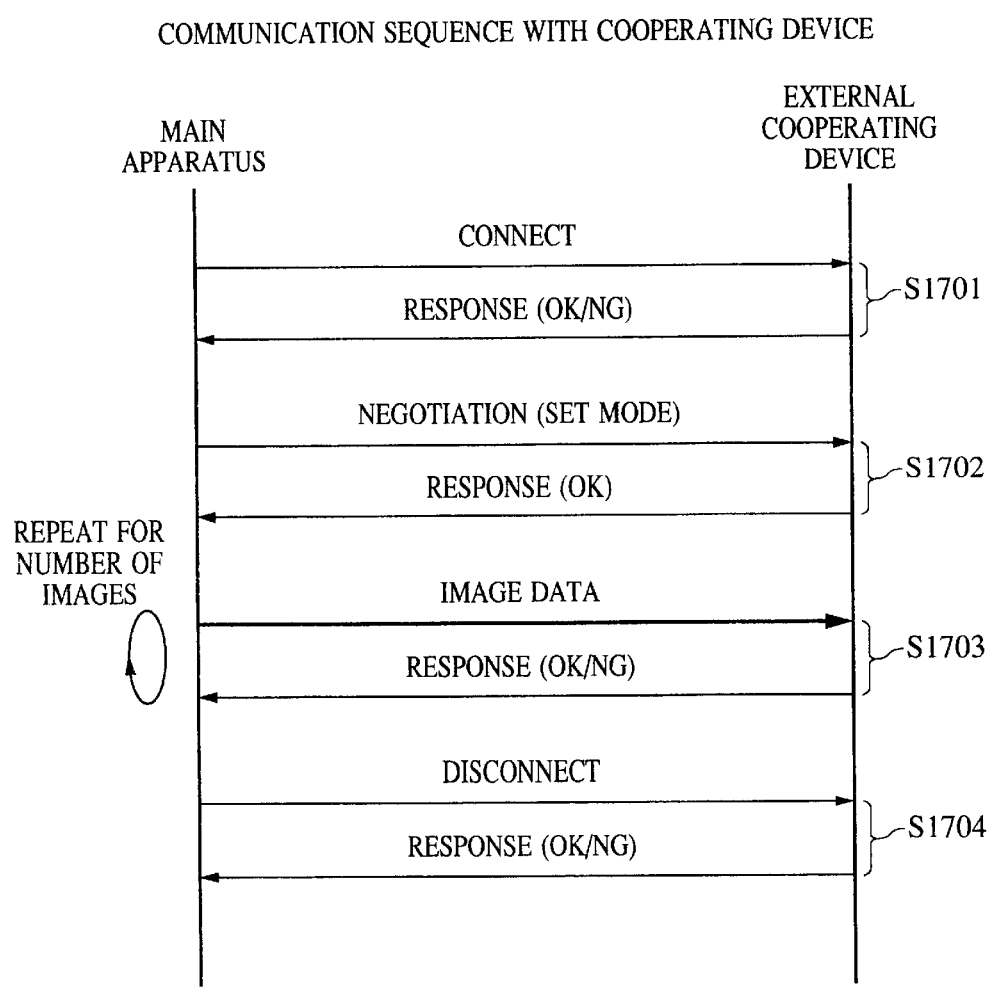
FIGS. 17 and 18 illustrate a communication sequence between the main apparatus and the external cooperating device in the second embodiment of the invention.

On the basis of the result reported in step S711, the apparatus notifies the user of the cause of trouble in the case of impossibility to conduct cooperation, as shown in FIG. 17 described later. When cooperation is possible in step S703, it is determined whether or not the external device is disconnected (step S705). Upon disconnection, the processing comes to an end. When the external device is not disconnected, the image data are received (step S706), and it is determined whether or not the image data was normally received (step S707).

When the image data was not normally received, a notice to that effect is given to the counterpart (step S710), and the processing steps beginning with step S705 are repeated. When the image data are normally received, the received image data are subjected to printing (step S708). Further, it is determined whether or not printing has properly been accomplished (step S709). In the case of failure of printing, printing in step S708 is repeated. When printing has properly been done, the process returns back to step S705 to determine whether or not there is disconnection, and the subsequent steps are repeated.

Figure 18:
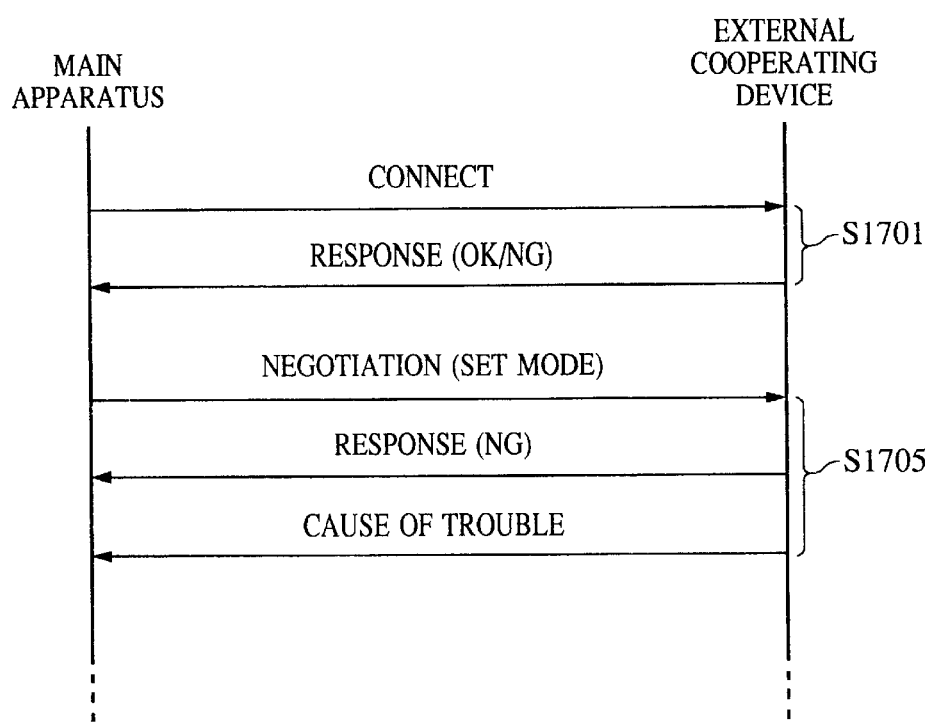

The communication sequences between the apparatus instructed to perform cooperation and the external cooperating device, relative to the processing described above with reference to FIGS. 12 to 16, will now be described with reference to FIGS. 17 and 18. As shown in FIG. 17, connection is made from the main apparatus to the external cooperating device in step S1701. Then, in step S1702, negotiations are made to exchange various pieces of information for cooperation, and it is determined whether or not cooperation is possible. When cooperation is possible, image data are transmitted from the apparatus to the external cooperating device in step S1703. Transmission of the image data is repeated a number of times equal to the number of images necessary to be transmitted. In step S1704, a notice of disconnection is given from the apparatus to the external cooperating device. Communication between the apparatus and the device has thus been completed. When cooperation is not possible, the impossibility of cooperation, the cause of the trouble, and values acceptable for setting for cooperation are reported to the external cooperating device in step S1705.

Details of the notice of the cause of trouble to the user in the case of impossibility of cooperation, described above with reference to FIG. 13, will now be described with reference to FIG. 19. As described above with reference to step S602 (FIG. 12), the user performs setting of various parameters as shown in FIG. 5. The notice of the cause of trouble is therefore expressed in a form corresponding to FIG. 5. In FIG. 19, 901 shows various parameters set in FIG. 5, and 902 displays whether the set values are normally acceptable or form a cause of trouble with "OK" and "NG". Parameters which may lead to trouble (that is, failure of cooperation) are displayed with bold-faced characters to facilitate discrimination by the user. Also in FIG. 19, 903 represents a display of a set value as specified by the user; and 904 is a set value acceptable by the external cooperating device, as notified through negotiations as described above. The user would therefore correct various set values in step S602 shown in FIG. 12 after confirming values forming a cause of trouble and values acceptable for setting.

According to the second embodiment, as described above, the copy machines 107 and 108 and the printer units 109 and 110 forming the image processing system comprise an RIP 205 conducting image processing on the basis of image processing, an image processing section 206, a compressing/expanding section 207, LAN 212 performing communication with the external device, and keys for entering instructions for operations in cooperation with the external device. There are further provided an operating section 221 having a display section which displays a cause of trouble when it is impossible to accomplish cooperation; and a CPU 201 which effects control so as to ensure cooperation with the other devices in compliance with an instruction entered from the operating section 221, and, upon occurrence of trouble, conducts control so as to achieve cooperation again. Therefore, when conducting processing through cooperation of a plurality of devices in parallel, it is possible for the user to easily learn the cause of the impossibility of cooperation, even when circumstances making it impossible to continue processing are caused by differences in supported functions between cooperating devices. It is thus possible to avoid the read for the user to perform complicated confirming operations for setting values again to ensure cooperation.

The present invention may be applied to a system comprising a plurality of devices, or to an apparatus comprising a single device. It is needless to mention that the objects of the invention can be achieved also by providing a system or an apparatus with a memory medium storing program codes of software for implementing the functions of the embodiments mentioned above and reading out and executing the program codes stored in the memory medium by means of a computer (or CPU or MPU) of that system or apparatus.

In this case, the program codes themselves read out from the memory medium serve to achieve the functions of the above embodiments, and the memory medium storing the program codes thus embodies the present invention.

Applicable memory media for supplying the program codes include, for example, a floppy disk, a hard disk, an optical disk, a photomagnetic disk, a CD-ROM, a CD-R, a magnetic tape, a non-volatile memory card and a ROM.

The functions of the foregoing embodiments are achieved by executing the program codes read out by the computer. In particular, the functions of the foregoing embodiments may be achieved through partial or total actual processing executed by an OS operating on the computer in accordance with an instruction of the program codes.

Furthermore, the program codes read out from the memory medium may be written in a function expanding board inserted into the computer or a memory provided in a function expanding unit connected to the computer, with a CPU or the like provided in that function expanding board or that function expanding unit conducting all or part of the actual processing; such processing serves to achieve the functions of the foregoing embodiments.

As described above, the present invention provides an image processing system to which a plurality of devices are connected via communication lines, which comprises image forming means for forming an image on the basis of image information, communication means for conducting communication with other devices via communication lines, and cooperating means for performing cooperation with other devices in compliance with an entered instruction. It is therefore possible to reduce the cost and maintenance workload and to further reduce the total processing time by causing simultaneous and parallel processing through cooperation of the plurality of devices, without providing a host computer for cooperation of the plurality of devices as in the conventional art. The user can select and instruct the other device which achieves the cooperation described above, thus providing the function of enabling the user to instruct cooperation or non-cooperation as before.

The invention also provides an image processing system to which a plurality of devices are connected via communication lines, which comprises image forming means for forming an image on the basis of image information, communication means for conducting communication with other devices via communication lines, cooperating means for performing cooperation with other devices in compliance with an entered instruction, a notifying means for giving a notice of the cause of a trouble when the trouble makes it impossible to conduct cooperation, and trouble avoiding means for making it possible to resume cooperation when such a trouble occurs. The user can therefore easily learn the cause of the impossibility of cooperation, when conducting simultaneous and parallel processing through cooperation of the plurality of devices, even when the impossibility of processing is caused by a difference in supported functions between the cooperating devices, thus making it unnecessary for the user to conduct complicated confirming operations to obtain cooperation between devices.

The invention also provides a method of controlling cooperation of an image processing system to which a plurality of devices are connected via communication lines. This method comprises the steps of forming an image on the basis of image information, communicating with other devices via communication lines, and conducting cooperation with the other devices in compliance with an entered instruction. It is therefore possible to reduce the cost and maintenance workload and to further reduce the total processing time by causing simultaneous and parallel processing through cooperation of the plurality of devices, without providing a host computer for cooperation of the plurality of devices as in the conventional art. The user can select and instruct the other device which achieves the cooperation described above, thus providing the function of enabling the user to instruct cooperation or non-cooperation as before.

The invention also provides a method of controlling cooperation of an image processing system to which a plurality of devices are connected via communication lines. This method comprises the steps of forming an image on the basis of image information, communicating with other devices via communication lines, conducting cooperation with the other devices in compliance with an entered instruction, signaling the cause of a trouble when the trouble makes it impossible to conduct cooperation and avoiding such trouble by making it possible to conduct cooperation again upon occurrence of the trouble. The user can therefore easily learn the cause of impossibility of cooperation, when conducting simultaneous and parallel processing through cooperation of the plurality of devices, even when the impossibility of processing is caused by a difference in supported functions between the cooperating devices, thus making it unnecessary for the user to conduct complicated confirming operations to obtain cooperation between devices.

The present invention has been described above with reference to the preferred embodiments. The invention is not however limited to these embodiments. It will be appreciated that various modifications and variations of the invention are possible within the range of the claims.

What is claimed is:

1. An image processing apparatus which transfers image information to another device connected to said apparatus using a communication line and processes the image information by means of the other device, said apparatus comprising:

reading means for reading an image and generating image information based on the image;

transmitting means for transmitting image processing conditions for processing the image information obtained by said reading means to the other device;

transferring means for transferring the image information obtained by said reading means to the other device, when image processing is executable by means of the other device under the transmitted image processing conditions;

receiving means for receiving, when image processing is not executable by means of the other device under the image processing conditions transmitted by said transmitting means, a response indicating alternative image processing conditions under which image processing is executable in place of the transmitted image processing conditions, where the alternative image processing conditions include a range for user selectable values;

displaying means for displaying alternative image processing conditions based on the response received by said receiving means; and selecting means for selecting a first mode where the image processing conditions are transmitted by said transmitting means before said reading means reads the image, or a second mode where the image processing conditions are transmitted by said transmitting means after said reading means reads the image.

2. An image processing apparatus according to claim 1, wherein the other device prints out the image information in accordance with the image processing conditions transmitted by said transmitting means.

3. An image processing apparatus according to claim 1, wherein the image processing conditions transmitted by said transmitting means include a plurality of image processing instructions, and said receiving means receives alternative image processing conditions for each of the plurality of image processing instructions.

4. An image processing apparatus which transfers image information to another device connected to said apparatus using a communication line and processes the image information by means of the other device, comprising:

reading means for reading an image and generating image information based on the image;

transmitting means for transmitting image processing conditions for processing the image information obtained by said reading means to the other device, the image processing conditions including a plurality of image processing instructions;

transferring means for transferring the image information obtained by said reading means to the other device, when image processing is executable by means of the other device under each of the plurality of image processing instructions included in the image processing conditions transmitted by said transmitting means;

receiving means for receiving a response indicating an image processing instruction under which image processing is not executable, when image processing is not executable by means of the other device under each of the plurality of image processing instructions included in the image processing conditions transmitted by said transmitting means;

displaying means for displaying whether each of the plurality of image processing instructions is accepted or not, based on the response received by said receiving means; and selecting means for selecting a first mode where the image processing conditions are transmitted by said transmitting means before said reading means reads the image, or a second mode where the image processing conditions are transmitted by said transmitting means after said reading means reads the image.

5. An image processing apparatus according to claim 4, wherein the other device prints out the image information in accordance with the plurality of image processing instructions included in the image processing conditions transmitted by said transmitting means.

6. A method of processing image information transferred from an image processing device to another device connected to the image processing device by a communication line, where processing of the image information is performed by means of the other device, the method comprising the steps of:
   reading an image and generating image information based on the image;
   transmitting image processing conditions for processing the image information obtained in said reading step to the other device;
   transferring the image information obtained in said reading step to the other device, when image processing is executable by means of the other device under the transmitted image processing conditions;
   receiving a response indicating alternative image processing conditions under which image processing is executable in place of the transmitted image processing conditions, when image processing is not executable by means of the other device under the image processing conditions transmitted in said transmitting step, where the alternative image processing conditions include a range for user selectable values;
   displaying alternative image processing conditions based on the response received in said receiving step; and
   selecting a first mode where the image processing conditions are transmitted before the image is read in said reading step, or a second mode where the image processing conditions are transmitted after the image is read in said reading step.

7. A method according to claim 6, wherein the other device prints out the image information in accordance with the image processing conditions transmitted in said transmitting step.

8. A method according to claim 6, wherein the image processing conditions transmitted in said transmitting step include a plurality of image processing instructions, and said receiving step includes receiving alternative image processing conditions for each of the plurality of image processing instructions.

9. A method of processing image information transferred from an image processing device to another device connected to the image processing device by a communication line, where processing of the image information is performed by means of the other device, the method comprising the steps of:
   reading an image and generating image information based on the image;
   transmitting image processing conditions for processing the image information obtained in said reading step to the other device, the image processing conditions including a plurality of image processing instructions;
   transferring the image information obtained in said reading step to the other device, when image processing is executable by means of the other device under each of the plurality of image processing instructions included in the image processing conditions transmitted in said transmitting step;
   receiving a response indicating an image processing instruction under which image processing is not executable, when image processing is not executable by means of the other device under each of the plurality of image processing instructions included in the image processing conditions transmitted in said transmitting step;
   displaying, in compliance with the response received in said receiving step, whether each of the plurality of image processing instructions is acceptable or not; and
   selecting a first mode where the image processing conditions are transmitted before the image is read in said reading step, or a second mode where the image processing conditions are transmitted after the image is read in said reading step.

10. A method according to claim 9, wherein the other device prints out the image information in accordance with the plurality of image processing instructions included in the image processing conditions transmitted in said transmitting step.

11. An image processing system wherein a first image processing device processes image information transferred from a second image processing device, said system comprising:
    said first image processing device; and
    said second image processing device, connected to said first image processing device by a communication line, said second image processing device including:
    reading means for reading an image and generating image information based on the image;
    transmitting means for transmitting the image processing conditions for processing the image information obtained by said reading means to said first image processing device;
    transferring means for transferring the image information obtained by said reading means to said first image processing device, when image processing is executable by means of said first image processing device under the transmitted image processing conditions;
    receiving means for receiving, when image processing is not executable by means of said first image processing device under the image processing conditions transmitted by said transmitting means, a response indicating alternative image processing conditions under which image processing is executable in place of the transmitted image processing conditions, where the alternative image processing conditions include a range for user selectable values;
    displaying means for displaying alternative image processing conditions based on the response received by said receiving means; and
    selecting means for selecting a first mode where the image processing conditions are transmitted by said transmitting means before said reading means reads the image, or a second mode where the image processing conditions are transmitted by said transmitting means after said reading means reads the image.

12. An image processing system according to claim 11, wherein said first image processing device prints out the image information in accordance with the image processing conditions transmitted by said transmitting means.

13. An image processing system according to claim 11, wherein the image processing conditions transmitted by said transmitting means include a plurality of image processing instructions, and said receiving means receives alternative image processing conditions for each of the plurality of image processing instructions.

14. An image processing system wherein a first image processing device processes image information transferred from a second image processing device, said system comprising:

said first image processing device; and said second image processing device, connected to said first image processing device by a communication line, said second image processing device including:

reading means for reading an image and generating image information based on the image;

transmitting means for transmitting image processing conditions for processing the image information obtained by said reading means to said first image processing device, the image processing conditions including a plurality of image processing instructions;

transferring means for transferring image information obtained by said reading means to said first image processing device, when image processing is executable by means of said first image processing device under each of the plurality of image processing instructions included in the image processing conditions transmitted by said transmitting means;

receiving means for receiving a response indicating an image processing instruction under which image processing is not executable, when image processing is not executable by means of said first image processing device under each of the plurality of image processing instructions included in the image processing conditions transmitted by said transmitting means;

displaying means for displaying whether each of the plurality of image processing instructions is accepted or not, based on the response received by said receiving means; and selecting means for selecting a first mode where the image processing conditions are transmitted by said transmitting means before said reading means reads the image, or a second mode where the image processing conditions are transmitted by said transmitting means after said reading means reads the image.

15. An image processing system according to claim 14, wherein said first image processing device prints out the image information in accordance with the plurality of image processing instructions included in the image processing conditions transmitted by said transmitting means.

* * * * *

UNITED STATES PATENT AND TRADEMARK OFFICE
CERTIFICATE OF CORRECTION

PATENT NO.    : 6,804,020 B1
DATED         : October 12, 2004
INVENTOR(S)   : Ken Kuroda It is certified that error appears in the above-identified patent and that said Letters Patent is hereby corrected as shown below:

Title page,
Item [30], Foreign Application Priority Data, "9/171197" should read -- 9-171197 --.

Column 5,
Line 44, "BC" should read -- PC --.

Column 13,
Line 9, "trouble" (both occurrences) should read -- problem --.
Line 12, "trouble" should read -- problem --.

Signed and Sealed this

Eighth Day of February, 2005

JON W. DUDAS
*Director of the United States Patent and Trademark Office*